No. 823,106.  
PATENTED JUNE 12, 1906.
A. T. COLLINS.
DRIER.
APPLICATION FILED MAR. 2, 1906.
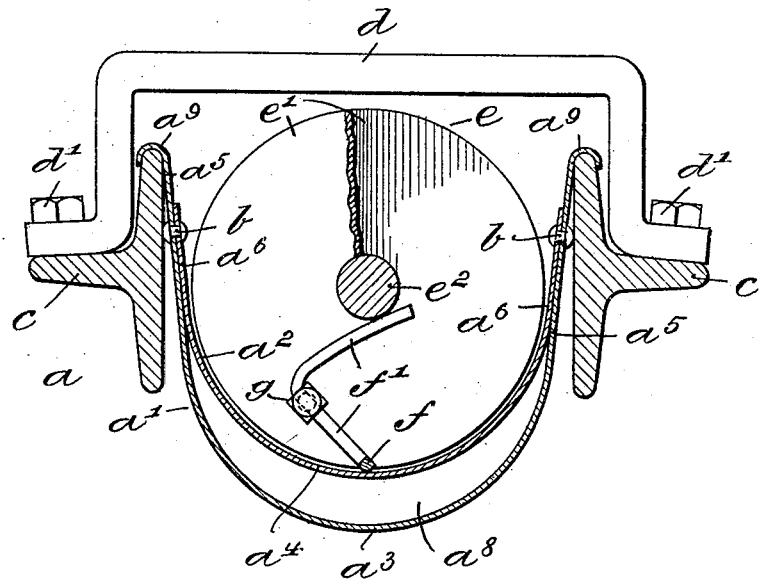
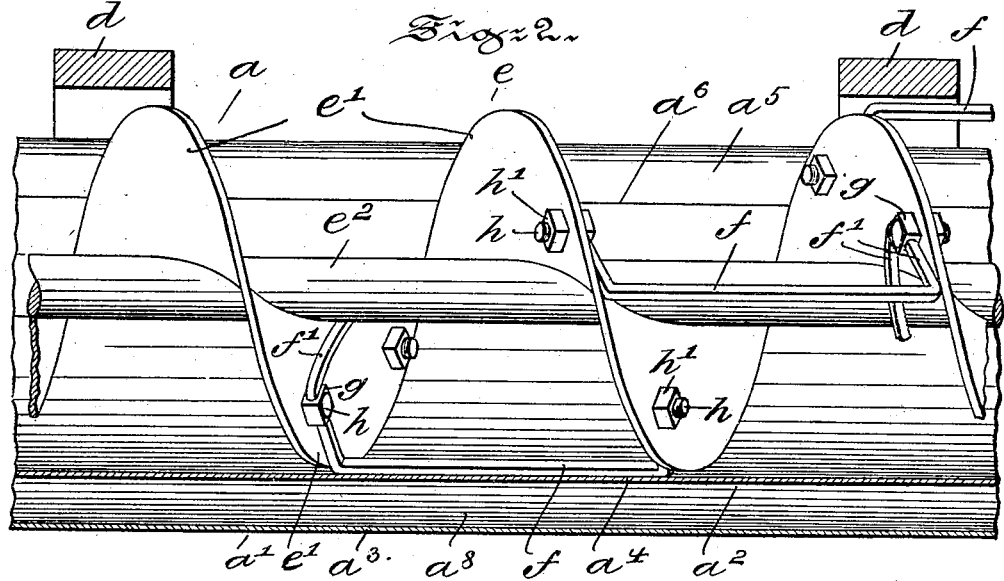
Witnesses:
Wilhelm Vogt
Thomas M. Smith
Inventor:
Arthur T. Collins,
By J. Walter Douglass
Attorney

UNITED STATES PATENT OFFICE.

ARTHUR T. COLLINS, OF SWARTHMORE, PENNSYLVANIA.

DRIER.

No. 823,106.　　　Specification of Letters Patent.　　　Patented June 12, 1906.

Application filed March 2, 1906. Serial No. 303,784.

*To all whom it may concern:*

Be it known that I, ARTHUR T. COLLINS, a citizen of the United States, residing at Swarthmore, in the county of Delaware and State of Pennsylvania, have invented certain new and useful Improvements in Driers, of which the following is a specification.

My invention has relation to that class of driers whereof a spiral conveyer is employed to move substances to be dried along the heated surface of a trough; and in such connection it relates particularly to means connected with the spiral blade to remove or scrape portions of a substance or material adhering to the trough not removed therefrom by the action of the spiral blade.

The principal objects of my invention are, first, to provide a drier for treating powdered or starchy substances having a spiral conveyer with yielding scrapers which irrespective of distortions caused by warping of the inner wall of the trough under the influence of heat reach the substance or material in distorted portions of the wall not acted on by the spiral conveyer; second, to arrange the scraper so that it will be held at all times in frictional contact with the trough, so as to follow irregularities of the same irrespective of the elevation or depth thereof; third, to connect the scrapers with the spiral blade, so that the same will be extended between contiguous faces of the two convolutions of the blade and rest parallel to the conveyer-shaft and flat against the inner surface of the trough to sweep and remove a substance or material by a lifting thereof from the trough and permitting of the substance or material to pass over the scraper and drop back into contact with the trough, and, fourth, to form the scrapers of a resilient material of small diameter, such as steel wire, preferably square in cross-section, so as to permit ends of the same to bear against the conveyer-shaft to compel the portion of the wire contacting with the trough to follow irregularities in the surface of the trough due to distortions induced by heating of the same.

The nature and scope of my present invention will be more fully understood from the following description, taken in connection with the accompanying drawings, forming part hereof, in which—

Figure 1 is a view illustrating, partly in cross-section and partly in elevation, a conveyer-trough, manner of forming a chamber for a heating medium, means for supporting the trough and for holding the supporting means in a fixed position with respect to each other, a spiral conveyer located in the trough, and a scraper pivotally connected with the blade of the conveyer and bearing at one end against the trough and at the other ends against the conveyer-shaft, all embodying main features of my said invention; and Fig. 2 is a view illustrating, partly in longitudinal section and partly in elevation, a portion of the trough, the spiral conveyer arranged therein, and the manner of arranging the scrapers between the spiral blade conveyer to scrape the surface of the trough and bring the scrapers alternately into engagement therewith.

Referring to the drawings, $a$ represents a trough, preferably formed of two sheets of metal $a'$ and $a^2$, bent at $a^3$ and $a^4$ into a semicircle, with respectively straight converging portions $a^5$ and $a^6$, which are united with each other, preferably by rivets $b$, to form a chamber $a^8$ of crescent shape in cross-section for the reception of steam, heated air, or other suitable heating medium. The straight portions $a^5$ of the outer wall of the trough $a$ are extended beyond the portions $a^6$ of the inner wall thereof and are again bent to form rests or ledges $a^9$, adapted to engage carriers or supports $c$, preferably formed of T-iron. The supports $c$ are held a certain distance apart by inverted-U-shaped yokes or spanners $d$, secured thereto by means of bolts $d'$. The heating medium—for instance, steam—when introduced in the chamber $a^8$ has a tendency to warp or distort the trough $a$ in a longitudinal direction, which distortion is effectually prevented by the supports $c$ and yokes $d$, forming combined a rigid structure of sufficient strength to resist pressure exerted thereon. In the trough $a$ so formed and supported are placed the starchy or powdered materials to be dried—for instance, ground mustard-seed or starch—which by resting upon the semicircular portion $a^4$ of the inner wall $a^2$ thereof is heated and the moisture removed therefrom by evaporation. If, however, the material to be dried is permitted to rest on the inner wall $a^2$ of the trough $a$, the same will burn and be rendered unfit for use. To overcome this disadvantage and permit of a uniform drying of the material without burning, it is moved forward in the trough by a spiral conveyer $e$, the blade $e'$ of which by being held in proximity to the wall $a^2$ and actuated by the shaft $e^2$ shifts the material along the trough. As soon, however, as the inner wall $a^2$ becomes distorted by the influence of the heat certain portions will be drawn away from the blade $c'$, permitting the material being dried to adhere to such distorted portion of the trough $a$ and by being overheated and becoming burned rendered unfit for further use. To reach and remove the material from the distorted portion of the trough $a$, the blade $e'$ of the spiral conveyer $e$ is provided with scrapers, preferably consisting of a steel-wire square in cross-section, which is bent to form a straight portion $f$, resting directly upon the inner wall $a^2$ of the trough $a$, and two upwardly-bent arms $f''$, bearing with their free ends against the shaft $e^2$ of the conveyer $e$ and resting flat against contiguous faces of the two convolutions of the blade $e'$. The arms $f''$ by means of blocks $g$ form bearings for the same and by the intervention of bolts $h$, passing through the blade $e'$, and nuts $h'$ engaging the bolts are pivotally connected with the blade $e'$. The arms $f''$ by bearing against the shaft $e^2$ will hold and bring the portion $f$ of the scrapers during the rotation of the conveyer $e$ into contact with the entire surface of the inner wall of the trough in the path of the respective scrapers, and thus remove material from the same, which owing to distortion of the wall $a^2$ has not been reached and moved along by the blade $e'$. The material lifted by the scrapers is permitted, owing to their small diameter, to pass readily over the scrapers to prevent banking up or accumulation of the material in front of the scrapers.

As shown in Fig. 2, the scrapers are placed between the blade $e'$ at certain distances apart, so as to alternately be brought into engagement with the interior surface of the trough $a$. As soon as the scrapers are brought out of engagement with the trough $a$, being resilient, will move forward a certain distance, by which jerking movement the material adhering thereto will be shaken off and automatically removed therefrom. Due to the particular outline of the heating-chamber $a^8$ of the trough $a$ the greater amount of heat is radiated by the central vertical portion at a point where the material to be dried is greater in volume than toward the tapering end portions of the chamber $a^8$. The material by the passage of the scrapers therethrough is stirred or agitated, so as to facilitate the drying operation.

Having thus described the nature and objects of my invention, what I claim as new, and desire to secure by Letters Patent, is—

1. In a drier of the character described, a trough adapted to receive material to be dried, a spiral conveyer arranged therein and adapted to move the material along said trough and a series of scrapers carried by said conveyer and arranged to engage and move the material not affected by the conveyer.

2. In a drier of the character described, a trough, consisting of two strips of metal forming united a chamber for a heating medium and a chamber for material to be dried, a support engaging said trough at its upper end and arranged to prevent distortion of the same in a longitudinal direction, a spiral conveyer arranged in the drying-chamber and adapted to move material longitudinally therein and scrapers carried by said conveyer adapted to be held in engagement with said trough and to move material not affected by the conveyer.

3. In a drier of the character described, a trough adapted to receive material to be dried, a spiral conveyer arranged therein and adapted to move the material longitudinally in said trough and a series of yielding scrapers carried by said conveyer adapted to be held by said conveyer in frictional engagement with said trough to follow irregularities of the inner wall thereof so as to move material not affected by said conveyer in a substantially spiral path in said trough.

4. In a drier of the character described, a trough adapted to receive and dry material placed therein, a conveyer, comprising a shaft and a spiral blade arranged thereon and adapted to move material longitudinally in said trough, and a series of scrapers held in frictional engagement with said trough and arranged to follow irregularities of the inner wall to remove adhering portions of the material passing beneath the blade of said conveyer.

5. In a drier of the character described, a trough adapted to receive and dry material placed therein, a conveyer, comprising a shaft and a spiral blade arranged in said trough and adapted to move material forward therein, and a series of scrapers pivotally connected with said blade, said scrapers, consisting of strips, engaging at one end the blade and at the opposite end the shaft, whereby the respective scrapers of said blade are held by said shaft in frictional contact with said trough.

6. In a drier of the character described, a trough adapted to receive and dry material placed therein, a conveyer comprising a shaft and a blade spirally mounted thereon and adapted to move the material forward in said trough, and a series of U-shaped scrapers pivotally connected with said blade and held by the same with their horizontal portions in engagement with said trough and with their vertical portions in engagement with said shaft.

In witness whereof I have hereunto set my signature in the presence of two subscribing witnesses.

ARTHUR T. COLLINS.

Witnesses:
GEO. W. REED,
J. WALTER DOUGLASS.